United States Patent [19]

Eckl

[11] Patent Number: 4,855,607

[45] Date of Patent: Aug. 8, 1989

[54] APPARATUS FOR ALIGNING A MOVING SUBSTRATE AND A READ OR WRITE HEAD

[75] Inventor: John K. Eckl, Norwalk, Conn.

[73] Assignee: Pitney Bowes, Inc., Stamford, Conn.

[21] Appl. No.: 139,501

[22] Filed: Dec. 30, 1987

[51] Int. Cl.$^4$ ............................................. G06K 15/00
[52] U.S. Cl. ..................................... 250/557; 250/561; 271/227
[58] Field of Search ................... 250/557, 223 R, 548, 250/561; 271/227; 382/65-67

[56] References Cited

U.S. PATENT DOCUMENTS

| | | | |
|---|---|---|---|
| 3,346,739 | 10/1967 | Jenkner | 382/65 |
| 3,603,446 | 9/1971 | Maxey et al. | 271/227 |
| 4,275,875 | 6/1981 | Akers | 271/214 |
| 4,432,540 | 2/1984 | Akers et al. | 271/179 |
| 4,438,917 | 3/1984 | Janssen et al. | 271/227 |
| 4,603,846 | 8/1986 | Miles | 271/250 |
| 4,641,828 | 2/1987 | Yajima | 271/227 |
| 4,693,463 | 9/1987 | Schwebel et al. | 271/253 |
| 4,699,370 | 10/1987 | Hashimoto et al. | 271/227 |
| 4,743,129 | 5/1988 | Keryhuel et al. | 271/227 |

FOREIGN PATENT DOCUMENTS 124459 6/1986 Japan ..................................... 271/227

OTHER PUBLICATIONS

Bantz et al, *IBM Technical Disclosure Bulletin*, vol. 20, No. 4, Sep. 1977, pp. 1623-1625.

Primary Examiner—F. L. Evans
Attorney, Agent, or Firm—Donald P. Walker; Melvin J. Scolnick; David E. Pitchenik

[57] ABSTRACT

An apparatus for aligning a moving substrate and a read or write head includes independently controllable rollers for deskewing the sensed skew of a moving substrate and a read or write device that is translatable in a direction fixed with respect to the reference direction of the moving substrate.

14 Claims, 3 Drawing Sheets

APPARATUS FOR ALIGNING A MOVING SUBSTRATE AND A READ OR WRITE HEAD

BACKGROUND OF THE INVENTION

The present invention generally relates to an apparatus for aligning a moving substrate and a read or write head and, in particular, relates to such an apparatus that ensures that a preselected segment of the moving substrate traverses the read or write head.

In many fields, particularly with the ever increasing use of automated document handing equipment, the ability to write upon or reading from a specific preselected segment of a moving substrate, such as, for example, an envelope, is an important step in the processing of information. One general field wherein this ability is paramount is the field of mail handling. Almost every person and business must, in some fashion, at some time, process mail. In some instances, the volume of mail processed is sufficiently low that the task of reading or writing information from or to each mail piece can be most efficiently performed manually. However, in many instances, the volume of mail pieces processed is so large that the task can be efficiently handled only by automated equipment.

One of the largest mail handling organizations is the U.S. Postal Service (USPS). In recent years, the USPS, in an effort to provide improved services, has begun using such techniques as the zip code, zip code character readers, postal bar coding and pre-bar coding. In order to maximize the benefits derived from such techniques, it has become necessary for standards to be established for the location of such information on mail documents. For example, in order to maximize the benefits of using an optical character reader (OCR) to ascertain a zip code on an envelope, the zip code must be located within the viewing field of the OCR. Typically, such various location standards are defined with respect to one or more edges of a document being processed, for example, in the instance of processing mail pieces the location may be defined with respect to the lower and leading edges of an envelope or the area of an envelope reserved the address. In order for such systems to function efficiently, the users of the USPS, as well as user of other similar delivery services, must print such information at, or in, these standard locations.

Currently, however, due, to some extent, to the high speed of the available equipment, the alignment of a moving substrate is not a simple task. For example, in the mail handling industry, it is quite common to transport documents, i.e., letters, envelopes, etc., over a predesigned path via a plurality of conveyor belts. Usually, such a path includes one or more changes of direction and may also include, for example, a carousel arrangement for orienting the documents so that a reference edge is proximate a fixed reference fence. The fixed reference fence thus provides a base line wherefrom a read or write head can be positioned with respect to a preselected segment of the document. Typically, in such a system, a mechanism is provided to urge the documents against the fixed reference fence.

Although systems are available that function quite satisfactorily, there nevertheless remain some difficulties. For example, a moving substrate may not be properly aligned, for instance, unless it is delivered, within a reasonable tolerance, to a particular point on a conveyor belt. In such a system, it is quite possible to process large numbers of unaligned documents without immediate detection. In the instance where such misalignment is prior to the time of printing upon an envelope, that envelope may subsequently have information printed thereupon outside of the accepted standard location. Such a misaligned printing reduces the efficiency of not only the mail processing system, but also the efficiency of the mail delivery service.

Consequently, an apparatus for adaptively aligning a moving substrate and a read or write head is highly desirable to improve the efficiency of document handling and, in particular, the processing of mail.

SUMMARY OF THE INVENTION

Accordingly, it is one object of the present invention to provide an apparatus for aligning a moving substrate and a read or write head.

This object is accomplished, at least in part, by an apparatus for aligning a movable substrate and a read or write head having means for deskewing a moving substrate and means for translating the read or write head so that a preselected segment of the moving substrate traverses the read or write head.

Other objects and advantages will become apparent to those skilled in the art from the following detailed description read in conjunction with the appended claims and the drawings attached hereto.

DETAILED DESCRIPTION OF THE INVENTION

Figure 1:
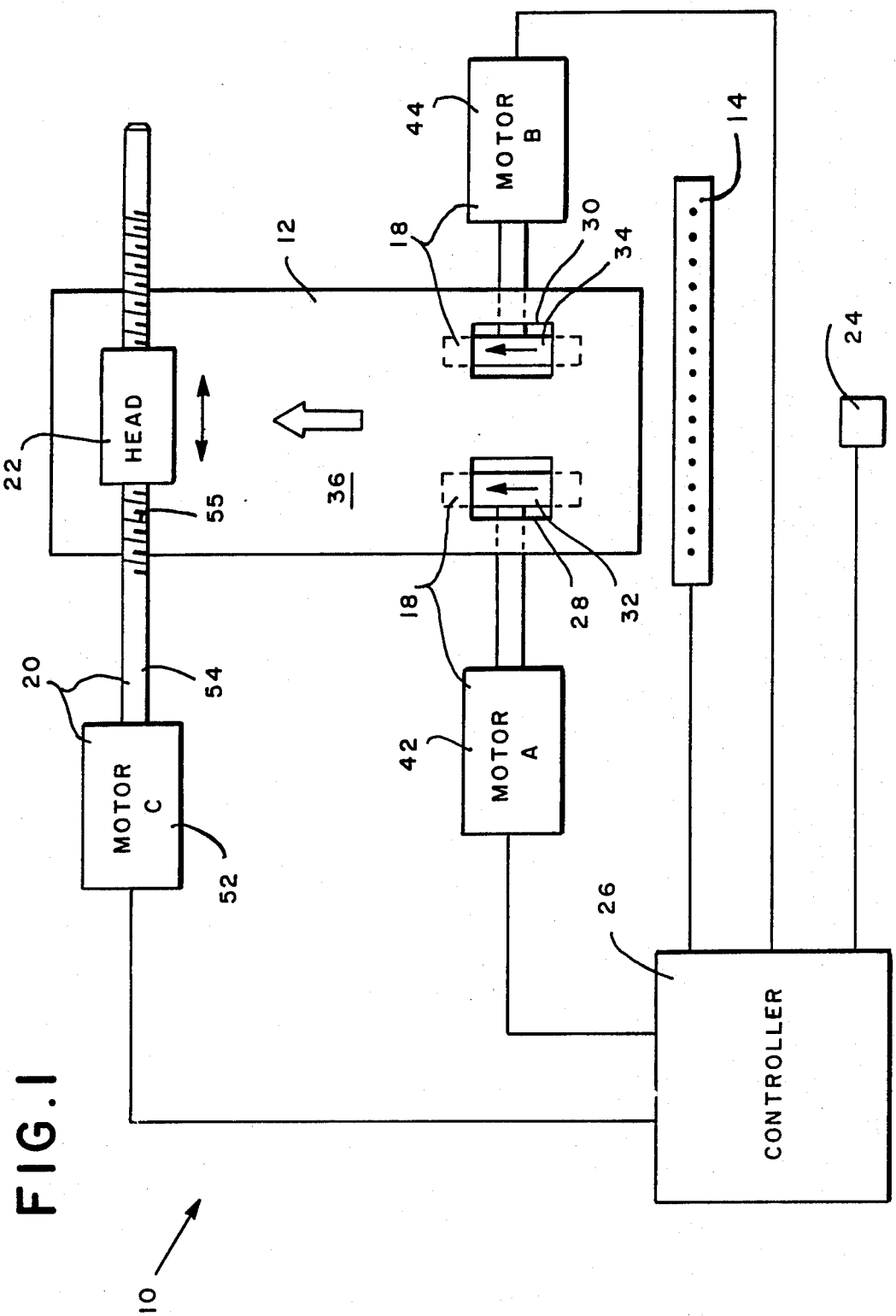
FIG. 1 is a pictorial view, not drawn to scale, of an apparatus for aligning a moving substrate and a read or write device and embodying the principles of the present invention.
Figure 2:
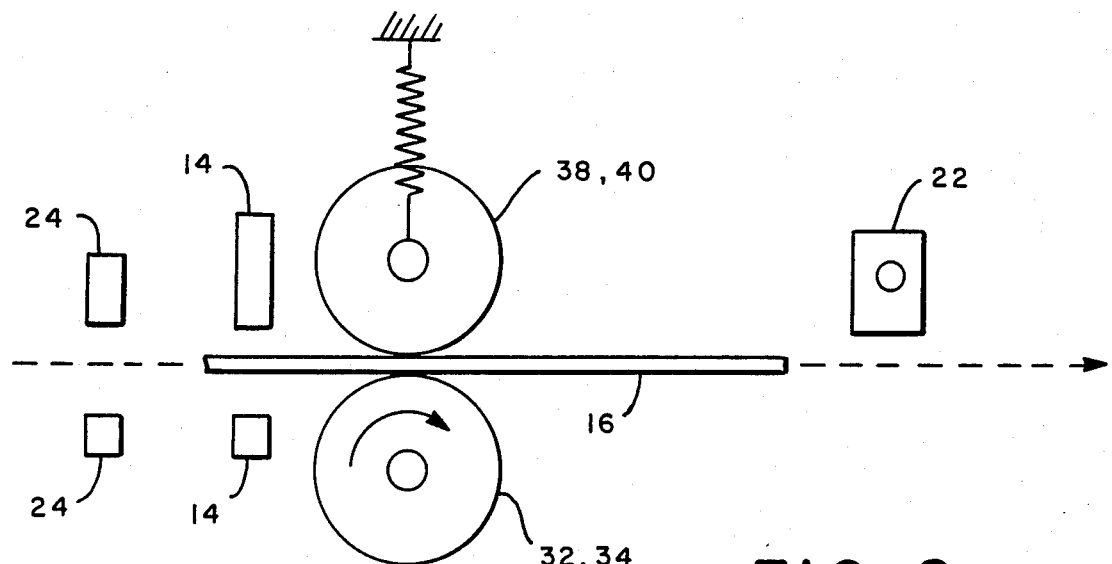
FIG. 2 is a side view representation, also not drawn to scale, of the apparatus shown in FIG. 1.

An apparatus for aligning a moving substrate and a read or write head, generally indicated at 10 in FIGS. 1 and 2 and embodying the principles of the present invention, includes a substrate support member 12, a means 14 for sensing the skew of a moving substrate 16, a means 18 for deskewing the sensed moving substrate 16, and means 20 for translating a read or write head 22 with respect to the direction of travel of the deskewed moving substrate 16.

Preferably, the apparatus 10 further includes means 24 for detecting the presence of a moving substrate 16 prior to the moving substrate 16 reaching the deskewing means 18 and an apparatus controller 26 adapted to coordinate the means 18 for deskewing with the means 20 for translating the head 22.

In one particular embodiment, a substrate 16 is conveyed along the substrate support member 12 that, for example, may be a printer transport deck. The substrate support member 12 is, in one embodiment, fashioned to include first and second slots, 28 and 30, respectively, therein. In addition, as more fully discussed below, first and second drive rollers, 32 and 34, respectively, are positioned to extend through the first and second slots, 28 and 30 respectively, to engage and move the substrate 16 along the surface 36 of the substrate support member 12. As shown in FIG. 2, the conveyance of the substrate 6 can be accomplished by the first and second drive rollers, 32 and 34, respectively, in conjunction with, for example, spring biassed first and second pinch rollers, 38 and 40, respectively. The pinch rollers, 38 and 40, are, in this embodiment, disposed opposing the drive rollers, 32 and 34, wherebetween the substrate 16, such as, for example, an envelope, may be engaged and transported to traverse the substrate support member 12. Typically, other conveying means, not shown in the drawings, are provided to convey the substrate 16 away from the head 22.

In this embodiment, the means 14 for sensing the skew of a moving substrate 16 includes a photodiode array having a plurality of photosensors. Preferably, the plurality of photosensors are aligned in a direction substantially parallel to the direction of translation of the read or write head 22.

In general, photosensors can be characterized as being reflective or transmissive. In the instance of a reflective photosensor the photo transmission portion and the photo receiving portion are disposed on the same side of the path of the object to be sensed. Thus, when an object passes thereunder the amount of light received changes and the photo receiver generates a signal indicative of the presence of the object. In the instance of a transmissive photosensor the photo transmitter and photo receiver are disposed on opposite sides of the path of the object to be sensed. Thus, when an object passes therebetween the amount of light received changes and the photo receiver generates a signal indicative of the presence of an object therebetween.

Figure 3:
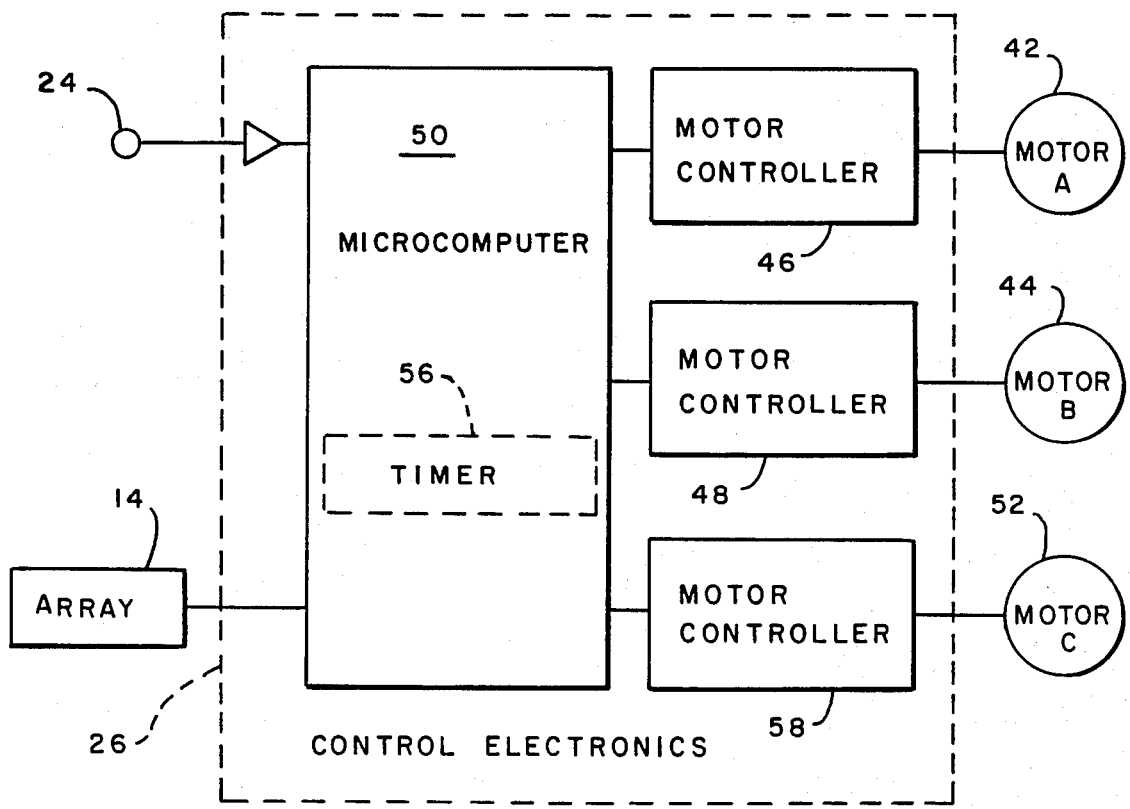
FIG. 3 is a block diagram of one embodiment of an electronic control system useful with the apparatus shown in FIGS. 1 and 2.

In one embodiment, the means 18 for deskewing the moving substrate 16 includes first and second motors, 42 and 44, respectively. Each motor, 42 and 44, preferably has an independent motor controller, 46 and 48, respectively, associated therewith. The motor controllers, 46 and 48, are preferably regulated by, as shown in FIG. 3, a microcomputer 50 that controls, independently, the speed of first and second motors, 42 and 44, respectively. In one configuration, the first and second motors, 42 and 44, respectively, are connected to the first and second drive rollers, 32 and 34, respectively. As a result, the speed of the first and second drive rollers, 32 and 34, respectively, can be adaptively and independently controlled such that the direction, i.e., the skew of different portions of a moving substrate 16, passing thereover and driven thereby, may be varied. The independent speed control provides a basic element of the means 18 for deskewing the moving substrate 16 and thus, the alignment of the movement thereof with a preselected reference direction. In the preferred embodiment, the preferred reference direction is substantially perpendicular to the direction of the translation of the read or write head 22. For example, write head 22 may be rotated by motor 52 and shaft 54 by means of worm gearing including worm 55 on shaft 54 and a worm wheel (not shown) associated with head 22.

In the preferred embodiment, the means 20 for translating a read or write head 22 includes a third drive motor 52 having a drive shaft 54 extending therefrom whereupon the read or write head 22 can be mounted so that the motion of the third drive motor 52 causes the translation of the read or write head 2 in a direction substantially perpendicular to the reference direction of the moving substrate 16.

As more fully discussed below, the skew of a moving substrate 16 is, in the preferred embodiment, detected by the number and location of particular ones of the individual photosensors of the array 14 that are covered, or occluded, during a particular sampling time. That is, the skew is determined by monitoring the photodiode array 14 to ascertain the number of photodiodes masked by an edge of the moving substrate 16. The dynamic status of the photosensors, i.e., covered or uncovered as the substrate moves past, is indicative of the angle that the moving substrate 16 is disposed with respect to the reference direction when that status is periodically sampled over time.

Preferably, the means 24 for detecting the entry of a moving substrate 16 includes at least one photosensor that provides a signal to the apparatus controller 26 upon a moving substrate 16 initially moving thereacross. More specifically, the leading edge of an envelope, in the instance of a mail handling apparatus, would cover, or occlude, the photoreceiver thus providing a signal indicating that in this use of the system 10, the leading edge of the envelope has the photosensor of the means 24. The time difference, therefore, between the time that the leading edge is detected by the photosensor 24 and the time that the same leading edge reaches the photosensor array 14 can be readily ascertained, by well known timing techniques, and computed by the microcomputer 50. Using conventional algebra, the speed of the envelope can thus be determined from the known distance between the photosensor and array 14 being divided by the time difference that the leading edge takes to traverse that spacing. Thus, this determination provides the entry speed of the moving substrate 16. The speed of the moving substrate 16, as more fully discussed below, can beused by the apparatus controller 26 for the desired alignment.

An exemplary apparatus controller 26 is shown in FIG. 3 in a configuration that is particularly advantageous for use with the apparatus 10 shown in FIGS. 1 and 2. In this embodiment, the apparatus controller 26 includes the microcomputer 50 having an electronic timer circuit 56, first and second motor speed controllers, 46 and 48, respectively, and, in one embodiment, a third stepper motor controller 58 for controlling the translation of the read or write head 22.

Figure 4:
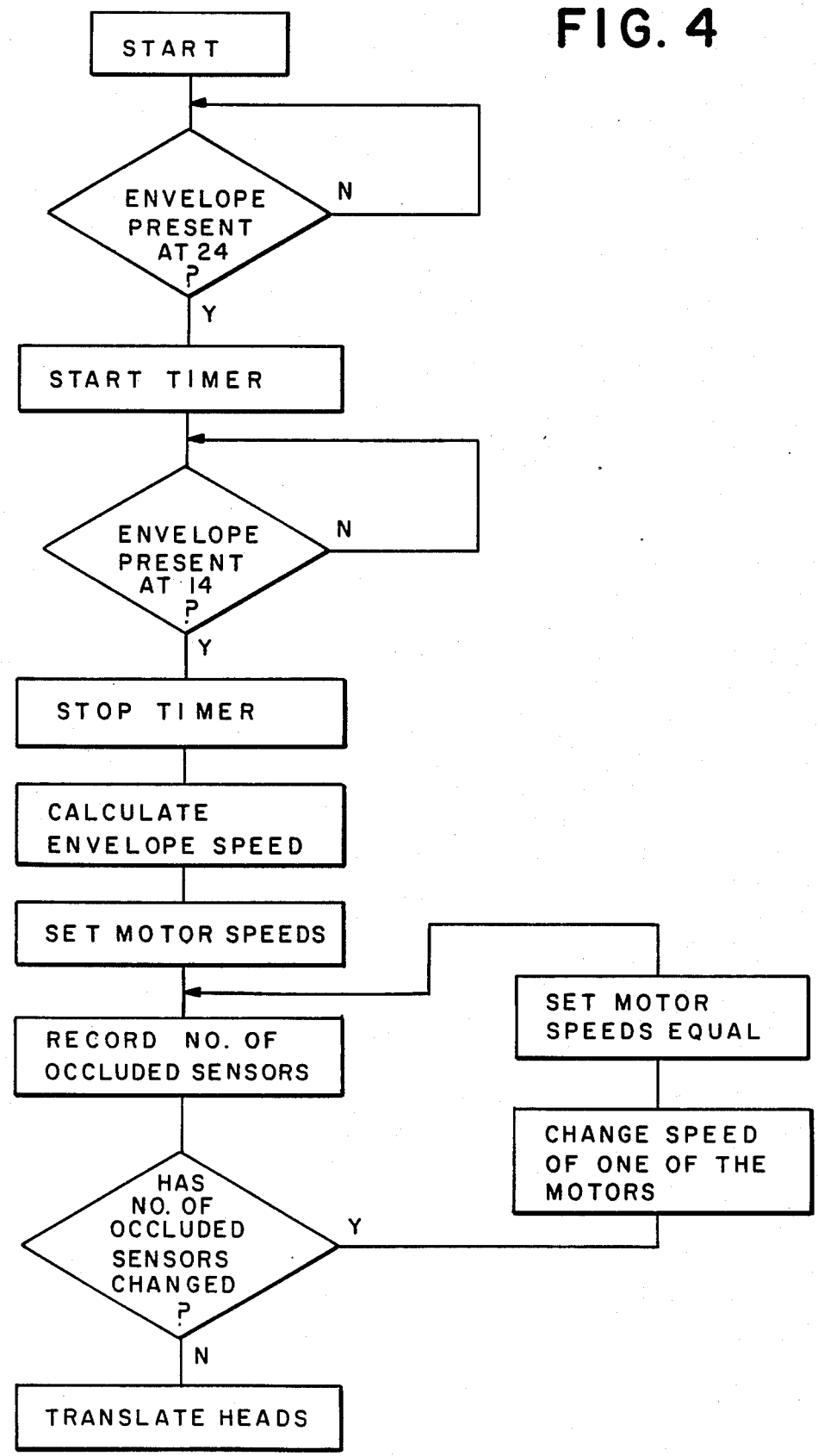
FIG. 4 is a flow diagram depicting the operation of one embodiment of an apparatus controller useful with the apparatus shown in FIGS. 1 and 2.

In one operation, the system 10 operates as shown in FIG. 4. The presence of a mail piece is initially detected by the photosensor 24. In response to the detection of the mailpiece, the timer 56 is started and continues to run until stopped when a photosensor element of the array 14 is occluded. From this time interval valve, the microcomputer 50 determines the speed of the mailpiece by dividing the known distance between the photosensor 24 and the array 14 by the time interval. The speed of the first and second drive roller motors, 42 and 44, respectively, are hence, initially adjusted to match the calculated speed of the moving substrate 16.

Such an initial setting helps to avoid jamming of the apparatus 10 and provides an operating base line measurement for any subsequent speed adjustments of the driver rollers, 32 and 34, used to deskew the mailpiece. In this embodiment, the number of occluded photo receivers in the photo array 14 is then counted and stored. At this point of the operation, the third motor 52 can be stepped to a position in response to the determined number of occluded photo receivers in the array 14. Such an adjustment to an initial head position redraws the time required for any further adjustment to the head position that may become necessary because of the deskewing of the envelope. The number of occluded photo receivers is, in one embodiment, frequently sampled and the number of changed conditions of the individual photo receivers is calculated.

By such sampling the skew of an envelope can be determined based on the changes, if any, of the number of occluded photo receivers in the array 14. If the number of occluded photo receivers decreases, the speed of one of the drive motors, 42 or 44, is increased for a finite amount of time whereafter the speed of that drive motor, 42 or 44, is returned to the original value thereof, i.e., to match the speed of the mailpiece. If the previous number of occluded cells increases, the speed of the other drive motor, 42 or 44, is increased for a finite amount of time and returned to the speed of the other drive motor, 42 or 44. This sequence, i.e. sampling the photo receivers of the array 14 and changing the speed of one of the drive motors, 42 or 44, is repeated until the number of occluded photo receivers remaining constant. In this fashion, not only is the moving substrate 16 deskewed, but the speed of the transport of the mailpiece is maintained to avoid the jamming of the apparatus 10.

Subsequent to the speed adjustments of the drive motors 42 and 44, the third stepper motor 52 is translated to an operative position based upon the number of occluded photo receivers in the array 14.

Subsequent to the substrate edge being deskewed, the now stable edge thereof can be used by the controller 26 to position the head 22 at the appropriate distance from the edge of the moving substrate 16 to ensure that reading or writing occurs within the preselected segment of the moving substrate 16.

The present apparatus is advantageous in that not only are individual moving substrates 16 deskewed to ensure that the read or write head 22 is properly positioned with respect to a preselected segment of the moving substrate 16 but also because the speed of each incoming moving substrate 16 is substantially uniform during the deskewing, thus avoiding jamming of the apparatus. A further advantage lies in the fact that a considerable amount of deskewing can be provided and, in fact, in an instance where the drive rollers, 32 and 34, are sufficiently distanced from the read or write head 22, a moving substrate 16 can be rotated by any desired amount. Such a rotation would be advantageous for handling moving substrates 16 that are not provided to the support member 12 in an aligned fashion. Furthermore, the complete rotation and, in fact, the deskewing of incoming moving substrates 16 occurs without the need for a fixed reference fence that is commonly provided in current transport mechanisms.

Although the present invention has been described herein with respect to a specific embodiment, it will be understood that other arrangements and configurations can be developed by those skilled in the art without departing from the spirit and scope of the present invention. Hence, the scope of the present invention is deemed limited only by the appended claims and the reasonable interpretation thereof.

What is claimed is:

1. An apparatus for aligning a moving substrate and a read or write head; said apparatus comprising:
    sensing means for sensing at least the edges of said moving substrate relative to a reference direction;
    deskewing means for deskewing said moving substrate with respect to said reference direction;
    translating means for translating said head relative to said reference direction; and
    controlling means for controlling said means for translating in response to said means for sensing such that a preselected segment of said moving substrate traverses said head.

2. Apparatus as claimed in claim 1 wherein said controlling means controls said deskewing means in response to said sensing means.

3. Apparatus as claimed in claim 2 wherein said sensing means comprises an array of sensors disposed such that said moving substrate traverses at least a portion thereof.

4. Apparatus as claimed in claim 3 wherein said array includes a plurality of photodiodes disposed in a linear array.

5. Apparatus as claimed in claim 2 wherein said controlling means includes a microcomputer.

6. Apparatus as claimed in claim 2 further comprising means for detecting the speed of said moving substrate prior to said moving substrate reaching said deskewing means.

7. Apparatus as claimed in claim 6 wherein said speed detecting means includes at least one optical sensor disposed in the path of said moving substrate, said at least one optical sensor generating a detection signal upon the arrival thereat of said moving substrate; said speed determining means determining the speed of said moving substrate in response to said detection signal and an initial sensing of said moving substrate by said sensing means.

8. Apparatus as claimed in claim 7 wherein said substrate speed determining means includes a microcomputer coupled to said sensing means and to said at least one optical sensor.

9. Apparatus as claimed in claim 2 wherein said deskewing means includes:
    a first means for selectively changing the speed of a first edge of said moving substrate;
    a second means for selectively changing the speed of a second edge of said moving substrate, said second edge opposing said first edge.

10. Apparatus as claimed in claim 9 wherein said deskewing means includes first controlling means for controlling said first speed changing means and second controlling means, independent of said first controlling means, for controlling said second speed changing means.

11. Apparatus as claimed in claim 9 wherein said first and second speed changing means includes first and second drive motors, respectively.

12. Apparatus as claimed in claim 2 wherein said translating means includes worm gearing coupled to said head, said worm gearing including a worm and rotating means for rotating said worm such that said head translates therealong.

13. Apparatus as claimed in claim 12 wherein said rotating means includes a bidirectional stepper motor coupled to rotate said worm.

14. Apparatus as claimed in claim 3 wherein said sensors are optical sensors and said controlling means comprises a microcomputer including means for determining at preselected intervals occlusion of said optical sensors by said moving substrate.

* * * * *